FLOTATION RECOVERY OF ZINC SULPHIDE FROM ORE

Barenya Kumar Banerji, Broken Hill, New South Wales, Australia, assignor to Unisearch Limited, New South Wales, Australia
Filed Nov. 30, 1971, Ser. No. 203,463
Claims priority, application Australia, Dec. 15, 1970, 2,495/70
Int. Cl. B01k 1/00
U.S. Cl. 204—130     3 Claims

ABSTRACT OF THE DISCLOSURE

The invention relates to flotation recovery of zinc sulphide from a slurry containing zinc sulphide bearing ore in ground form by adding to the slurry a collector and then a frothing agent and passing a direct current from a low voltage source between copper electrodes through the slurry.

---

This invention relates to flotation recovery of zinc sulphide minerals from zinc sulphide bearing ore and has been devised to substantially reduce the cost of recovery.

In the flotation of lead-zinc sulphide ore as currently practised, galena is recovered first usually with xanthate as collector. During the recovery of lead, flotation of zinc sulphide minerals is prevented by the addition of appropriate depressants. After the removal of lead minerals, the slurry containing zinc sulphide particles has to be treated with a suitable additive (called an "activator") to render the zinc sulphide minerals amenable to flotation once again with xanthate. Z-200 (isopropyl ethyl thionocarbamate) or other suitable reagents as collector. Under normal industrial conditions, copper sulphate is added as "activator" for zinc flotation. The general practice is to add 0.6–1.5 lbs. of copper sulphate per ton of ore depending upon the response of the ore under given conditions. On an average, about 1 lb. $CuSO_4$, $5H_2O$ per ton of ore is added.

In the chemical reaction between sodium ethyl xanthate and copper sulphate, the stoichiometric proportions are represented in the equation:

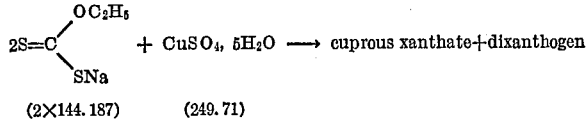

The equation given above requires the addition of xanthate to copper sulphate in the weight ratio of 1:0.866. Average xanthate addition in industrial zinc flotation rarely exceeds 0.15–0.2 lb./ton, so that the theoretically required quantity of copper sulphate should not exceed 0.13–0.17 lb./ton. In actual practice, however, six to eight times the theoretical requirement has to be added for satisfactory results. The most probable reason for the wastage of copper sulphate is due to the formation of insoluble copper compounds by chemical reactions with dissolved impurities in water.

The object of the present invention is to eliminate the use of copper sulphate as an additive from the flotation process.

According to the present invention, instead of adding copper sulphate to the slurry, a direct current from a low voltage source is passed between two copper electrodes through the slurry after a collector followed by a frothing agent in added to the slurry. The very reactive copper ions thus generated are instantly absorbed on the surface of the circulating zinc sulphide minerals leaving little time for secondary reactions.

Figure 1:
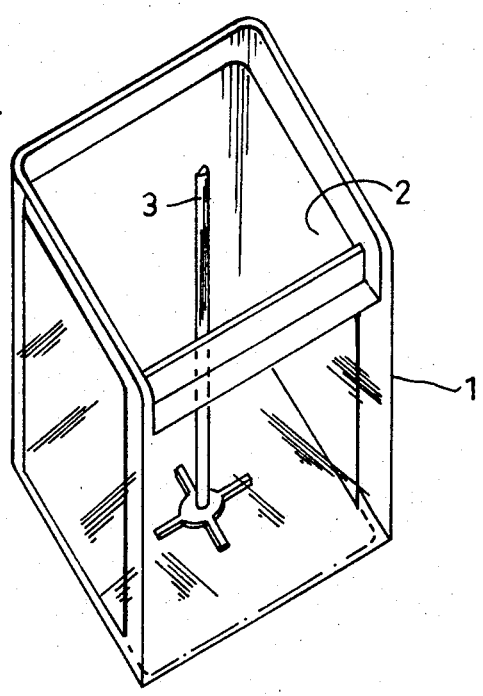
Figure 2:
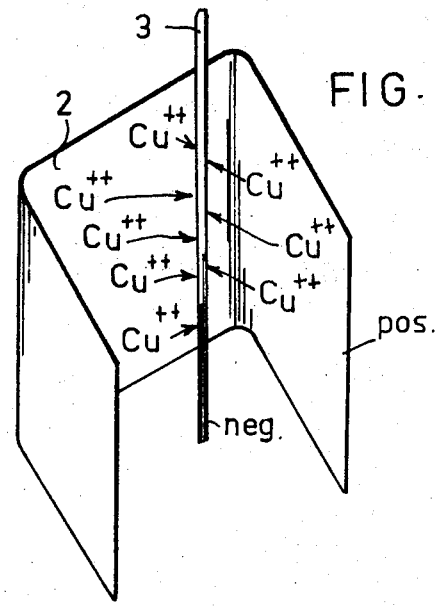
Figure 3:
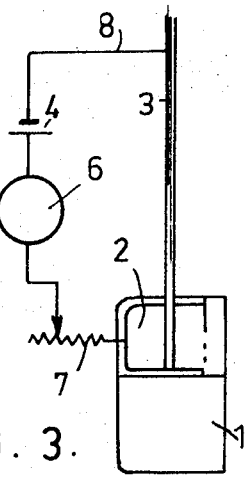

One experimental method of carrying the invention into effect is described with reference to the annexed drawings wherein:

FIG. 1 is a perspective view of the relevant parts of a glass flotation cell having a port copper lined and connected to a positive terminal and an impeller in the cell connected to the negative terminal, FIG. 2 is a diagrammatic view showing the manner in which the electrolytically generated ions can travel through the slurry and FIG. 3 shows the general arrangement of the experimental apparatus.

In the drawings, 1 represents a glass flotation cell having a copper lining 2, an impeller 3 mounted in the cell 1 has means (not shown) whereby it can be actuated. A lead acid 12 volt battery 4 has its positive lead 5 connected through an ammeter 6 and rheostat 7 to the copper lining 2 and its negative lead 8 connected to the impeller 3.

The most straightforward method of electrolytic generation of copper ions in the slurry was tried. A direct electrical current from a 12 volt lead acid battery was passed between two copper electrodes (3" x 3"). It was found that in this manner electrolytic copper ions produced the same effect as copper sulphate but there was no advantage in respect of copper consumption. In both cases the equivalent of 0.255 lb./ton of $Cu^{++}$ was required for optimum results. The cost advantage in favour of electrolytically generated copper ions was only marginal.

To improve the efficiency of utilisation of electrolytically generated copper ions, it is necessary to increase the surface area of the electrode generating copper ions. To this end a sheet of copper 2 covering three sides of a flotation cell (excluding the front only) is introduced as a copper lining and this is connected to the positive terminal of the battery. The impeller 3 is connected to negative terminal of the battery as shown in FG. 1. There are two reasons for the greater efficiency of this arrangement. Firstly, because of the greater surface area of the anode, more copper ions come into contact with the zinc sulphide particles in the slurry. Secondly, because of the large anode/cathode ratio of surface area and the location of the copper lining and the impeller, the electrolytically generated copper ions can travel through the slurry as shown in FIG. 2.

APPLIED VOLTAGE

In the experimental work here described, direct electric current was obtained from a 12 volt lead-acid battery 4. This can be easily replaced by an arrangement to obtain low voltage direct current by conversion from the A.C. mains supply by the use of an appropriate rectifier and transformer. Best results are obtained with a low voltage direct current as otherwise power consumption is unnecessarily increased. About 12 volts D.C. is found quite satisfactory. The general arrangement for the experiment is given in FIG. 3.

DURATION OF PASSAGE OF CURRENT

The time for which elastic current is passed depends on the value of the current. For example, good results can be obtained for a feed of 500 gms. of ore with either 1.2 amperes for 1 min. or 0.6 ampere for 2 mins. i.e., 1.2 ampere-minutes. This corresponds to 2440 ampere-minutes per ton of ore. The simplest and most economical procedure would be to use the maximum current for the minimum length of time.

In the experimental results given here 0.6 ampere was passed for a total of 2 minutes—80 seconds for the first concentrate and 40 seconds for the second concentrate. Time of passage of current of this order is quite appropriate because in industrial practice, the time the slurry remains in one floation cell is about ½ to 1 min.

Therefore, depending upon the value of the current, the introduction of copper lining in one or two flotation cells in a series of cells would be adequate for any stage of concentration.

EXPERIMENTAL EXAMPLES

Feed.—500 gms. dry weight (a) Electrolytic copper ions: For Concentrate I, 0.09 lb./ton sodium ethyl xanthate the collector was added to the slurry first and a frothing agent, e.g. that known under the trademark Aerofroth 65 was added. Then a current of 0.6 ampere was passed for 80 seconds and conditioned for 2 minutes. Flotation recovery gave Concentrate I.

For Concentrate II, 0.045 lb./ton sodium ethyl xanthate was again added so slurry after recovery of Concentrate I and Aerofroth 65 also added. A current of 0.6 ampere was passed for 40 seconds and conditioned for 2 minutes. Flotation recovery gave Concentrate II.

Thus total input for electrolytic copper ions is:

Quantity of electricity (at 12 volts) 2440 ampere-minutes/ton of ore
Sodium ethyl xanthate=0.135 lb./ton
Aerofroth 65 as required.

(b) Copper sulphate standard test—control: 1 lb./ton $CuSO_4, 5H_2O$ was added to slurry and conditioned for 5 minutes. Then for Concentrate I, 0.09 lb./ton sodium ethyl xanthate was added and slurry conditioned for 2 minutes and Aerofroth 65 added. Flotation recovery gave Concentrate I.

After recovery of Concentrate I, 0.045 lb./ton sodium ethyl xanthate was again added and conditioned for 2 minutes. Aerofroth 65 was added and flotation recovery gave Concentrate II.

Total reagent requirement for control experiment:

$SuSO_4, 5H_2O$=1 lb./ton
Sodium ethyl xanthate=0.135 lb./ton
Aerofroth 65 as required.

Since the quantity of collector and frother used in all the experiments were identical, the experiments essentially gave a quantitative comparison of performance between the standard industrial practice of addition of 1 lb./ton $CuSO_4, 5H_2O$ (0.255 lb./ton $Cu^{++}$) and 2440 ampere-minutes of electrolytically generated copper ions per ton of ore with direct current at 12 volts. The latter corresponds to (0.1062 lb./ton $Cu^{++}$) 48.2 gms. of copper and 0.488 kw. hr. of electrical power per ton of ore treated. The only difference was that for electrolytic copper ions, the copper was added in two installments whereas in the standard practice the copper sulphate was introduced in a single installment.

EXPERIMENTAL RESULTS

SERIES A

Feed material.—Filtered wet de-leaded tailing from Source 1

| Method of treatment | Fraction | Wt. percent | Assay Zn, percent | Distribution Zn, percent |
|---|---|---|---|---|
| Electrolytic copper ions | Concentrate I | 14.9 | 52.2 | 74.2 |
| E.M.F. 12 volts: | Concentrate II | 6.0 | 38.4 | 22.0 |
| 2,440 ampere-minutes per ton of ore | Total zinc recovery | 20.9 | 48.24 | 96.2 |
| $Cu^{++}$ equivalent 0.1062 lb./ton | Residue | 79.1 | 0.5 | 3.8 |
|  | Feed (calculated) | 100.0 | 10.48 | 100.0 |
| Copper sulphate standard test—Control | Concentrate I | 17.4 | 51.6 | 85.9 |
|  | Concentrate II | 2.3 | 36.3 | 8.0 |
| $CuSO_4, 5H_2O$=1 lb./ton | Total zinc recovery | 19.7 | 49.81 | 93.9 |
| $Cu^{++}$ equivalent 0.255 lb./ton | Residue | 80.3 | 0.8 | 6.1 |
|  | Feed (calculated) | 100.0 | 10.45 | 100.0 |
| Electrolytic copper ions | Concentrate I | 14.4 | 52.0 | 71.7 |
| E.M.F. 12 volts: | Concentrate II | 6.2 | 40.0 | 23.7 |
| 2,440 ampere-minutes per ton of ore | Total zinc recovery | 20.6 | 48.39 | 95.4 |
| $Cu^{++}$ equivalent 0.1062 lb./ton | Residue | 79.4 | 0.6 | 4.6 |
|  | Feed (calculated) | 100.0 | 10.44 | 100.0 |

SERIES B

Feed material.—Filtered wet de-leaded tailing from Source 2

| Method of treatment | Fraction | Wt. percent | Assay Zn, percent | Distribution Zn, percent |
|---|---|---|---|---|
| Electrolytic copper ions | Concentrate I | 18.6 | 54.4 | 79.7 |
| E.M.F. 12 volts: | Concentrate II | 5.5 | 41.4 | 17.9 |
| 2,440 ampere-minutes per ton of ore | Total zinc recovery | 24.1 | 51.43 | 97.6 |
| $Cu^{++}$ equivalent 0.1062 lb./ton | Residue | 75.9 | 0.4 | 2.4 |
|  | Feed (calculated) | 100.0 | 12.70 | 100.0 |
| Copper sulphate standard test—Control | Concentrate I | 21.9 | 54.0 | 92.2 |
|  | Concentrate II | 2.5 | 17.2 | 3.4 |
| $CuSO_4, 5H_2O$=1 lb./ton | Total zinc recovery | 24.4 | 50.23 | 95.6 |
| $Cu^{++}$ equivalent 0.255 lb. ton | Residue | 75.6 | 0.75 | 4.4 |
|  | Feed (calculated) | 100.0 | 12.82 | 100.0 |
| Electrolytic copper ions | Concentrate I | 19.1 | 55.0 | 81.4 |
| E.M.F. 12 volts: | Concentrate II | 4.4 | 44.0 | 15.0 |
| 2,440 ampere-minutes per ton | Total zinc recovery | 23.5 | 52.94 | 96.4 |
| $Cu^{++}$ equivalent 0.1062 lb./ton | Residue | 76.5 | 0.6 | 3.6 |
|  | Feed (calculated) | 100.0 | 12.90 | 100.0 |

SERIES C

Feed material.—Filtered wet de-leaded tailing from Source 3

| Method of treatment | Fraction | Wt. percent | Assay Zn, percent | Distribution Zn, percent |
|---|---|---|---|---|
| Electrolytic copper ions | Concentrate I | 6.5 | 51.6 | 44.2 |
|  | Concentrate II | 8.2 | 45.8 | 49.5 |
| E.M.F. 12 volts: |  |  |  |  |
| 2,440 ampere-minutes per ton of ore | Total zinc recovery | 14.7 | 48.36 | 93.7 |
| $Cu^{++}$ equivalent 0.1062 lb./ton | Residue | 85.3 | 0.56 | 6.3 |
|  | Feed (calculated) | 100.0 | 7.59 | 100.0 |
| Copper sulphate standard test—Control | Concentrate I | 13.1 | 50.1 | 88.2 |
|  | Concentrate II | 1.8 | 17.6 | 4.3 |
| $CuSO_4, 5H_2O = 1$ lb./ton | Total zinc recovery | 14.9 | 46.13 | 92.5 |
| $Cu^{++}$ equivalent 0.255 lb./ton | Residue | 85.1 | 0.66 | 7.5 |
|  | Feed (calculated) | 100.0 | 7.44 | 100.0 |
| Electrolytic copper ions | Concentrate I | 8.2 | 51.7 | 55.7 |
|  | Concentrate II | 6.3 | 45.0 | 37.3 |
| E.M.F. 12 volts: |  |  |  |  |
| 2,440 ampere-minutes per ton of ore | Total zinc recovery | 14.5 | 48.79 | 93.0 |
| $Cu^{++}$ equivalent 0.1062 lb./ton | Residue | 85.5 | 0.62 | 7.0 |
|  | Feed (calculated) | 100.0 | 7.60 | 100.0 |

From the results it can be seen that with electrolytic copper ions, total zinc recovery and zinc content of residue are in each case comparable to the corresponding results obtained in the control experiment with copper sulphate. Since the quantity of copper required in electrolytic generation is considerably less (Cu=0.1062 lb./ton) when compared with standard test with 1 lb./ton $CuSO_4, 5H_2O$ (Cu=0.255 lb./ton) it is established that considerable economy can be effected by replacing the use of copper sulphate by electrolytically generated copper ions. The benefit of this replacement is claimed in flotation operations wherever copper sulphate can be replaced by electrolytically generated copper ions. The extent of this benefit can be seen from the comparison of cost given below:

COMPARISON OF COST (PER TON OF ORE TREATED)

(a) In existing practice

Sost of 1 lb. $CuSO_4, 5H_2O = 18.5$ cents (b) In the new technique (electrolytic copper)

|  | Cents |
|---|---|
| Cost of 0.1062 lb. copper at 50 cents/lb. | 5.31 |
| Cost of 0.488 kwhr. electrical power at 2 cents/kwhr. | 0.976 |
| Total | [1] 6.286 |

[1] Or roughly 6.3 cents.

Thus the cost of copper sulphate currently being used could be reduced to approximately one-third. Any mill processing 1 million tons of ore annually could effect a saving of up to $120,000 per year by using the technique described here. The method is simple and can be easily adapted to equipment currently in use.

What is claimed is:

1. The method of flotation recovery of zinc sulfide from a slurry containing zinc sulfide bearing ore in ground form in a flotation cell, said cell having a copper liner part which is connected to a positive terminal of a low voltage source and having an impeller in the cell connected to the negative terminal of said low voltage source, said copper lined part being the anode and said impeller being the cathode, the ratio of the anode to cathode surface areas is large, said method comprising adding to said slurry a collector and then a frothing agent and passing a direct current from a low voltage source between the anode and cathode whilst immersed in the slurry for the purpose of generating copper ions through the slurry.

2. The method of flotation recovery of zinc sulfide acording to claim 1 wherein the collector is sodium ethyl xanthate.

3. The method of flotation recovery of zinc sulfide according to claim 1 using a current rate of 2440 ampere-minutes per ton of ore.

References Cited

UNITED STATES PATENTS

| 1,261,023 | 4/1918 | Griffith | 204—92 |
| 1,545,132 | 7/1925 | Brabbous | 204—130 |
| 3,476,663 | 11/1969 | Norris | 204—151 |
| 3,479,281 | 11/1969 | Kikindai et al. | 209—164 X |

FOREIGN PATENTS

| 194,679 | 6/1967 | U.S.S.R. | 204—130 |

FREDERICK C. EDMUNDSON, Primary Examiner

U.S. Cl. X.R.

204—86, 92, 212, 273